Patented Aug. 15, 1933

1,923,043

UNITED STATES PATENT OFFICE 1,923,043

METHOD OF RESTRAINING DYE DIFFUSION AND RESULTING PRODUCT

Leonard T. Troland, Cambridge, Mass., assignor, by mesne assignments, to Technicolor, Inc., New York, N. Y., a Corporation of Delaware No Drawing. Application May 24, 1928
Serial No. 280,381

10 Claims. (Cl. 101—149)

This invention relates to a method of producing dye images in gelatine films and the like, and for preventing diffusion of the same.

In the photographic art it is a relatively common experience to have to produce colored images of an extremely fine order of exactitude with respect to both definition and color values. These images may be formed upon and in the surface of a gelatine film or a gelatine coating containing a developed image by the appropriate application thereto of a dye solution, or by direct transfer from a matrix film carrying the dye wet image thereon (which may be in relief) to a blank surface by effecting imbibition contact between the two surfaces.

In either case it is found that, by the very property which permits the dye image to be formed on or in the gelatine surface,—namely the capacity of the surface to be wet by or to imbibe the dye solution,—the image may be distorted or become blurred or indistinct if the dye continues to penetrate through the film. This is especially apparent if it penetrates laterally beyond the original margins of the areas to which it is applied or by which it is adsorbed. Such penetration or diffusion may be of extremely small dimensions and yet effectually manifest itself upon direct inspection of the resulting product. If the image is magnified,—as is the case with cinematographic films for example, it is obvious that extremely minute deviations from the proper margins of the image will become readily apparent and need scarcely be of measurable size in the original to practically prevent the use of the film for its intended purpose.

It is therefore an object of the invention to prevent such diffusion or creeping of the dye within or away from the proper areas of the image. It is also an object to protect the image from such diffusion by subsequent treatments to which the film may be subjected, such as washing, printing with a second dye, or the like. Other objects will appear from the following disclosure.

The method of the invention includes a preliminary application of a dye image to the gelatine film or other appropriate surface,—as by imbibition printing, usually with an acid dye, followed by treating the dyed surface with a solution typically containing a salt of a bivalent metal, such as copper, zinc, manganese, or lead, and finally washing off the excess of reagents with water, and drying if desired.

As thus prepared, the film may be subsequently printed or dyed, according to usual practices without diffusion of the first dye, intermingling of the first with the second dye, or appreciable diffusion of the second dye beyond the areas to which it is applied. If a third dye is to be used, a second treatment with the salt solution may follow the second dyeing operation, more positively to fix the freshly applied dye, and so on.

Whether the salt solution is effective upon the color substance or upon the film or upon an association condition or chemical compound of the two is not conclusively demonstrated. The effective and practical result of fixing the dye or like coloring matter in situ is readily manifested however, and the colored images thus prepared in accordance with the invention are effectively restrained from diffusion over or through the surfaces upon which they have been developed or applied.

A specific instance of the application of the invention is found in the preparation of colored cinematographic films. These may be made conveniently by forming a relief positive or negative developed upon a photographic emulsion film, hardening the film, if desired, wetting the same with an appropriate dye solution,—preferably one which is adsorbed by the developed areas of the images in proportion, more or less, to the relative degrees of development,—and effecting an intimate face contact of the dye-wetted matrix film with a blank film which preferably is a water wet gelatine coated film.

A suitable dye solution for this purpose may have the following composition:

| | Color Index No. | Schulze No. | |
|---|---|---|---|
| 6% solution— | | | |
| Magenta B N | 692 | 524 | 4500 cc. |
| Metanil yellow | 138 | 134 | Approximately 30 grs. |
| 3% solution— | | | |
| Red S | 176 | 161 | 10,000 cc. |
| Glacial acetic acid | | | 900 cc. |
| Water to make total volume | | | 18,000 cc. |

Thereupon the dye image on the matrix film is transferred, by imbibition, directly to and into the blank film surface. When the transfer is substantially complete, the two surfaces may be separated, leaving a dye image of the matrix film upon (and in) the surface of the blank film which is effectively the exact ectype of the matrix image. Moreover, its depth of penetration is substantially proportional to the amount of dye which in turn is proportional to the degree of development of the image in the matrix film.

The printed film is now immersed in a dilute aqueous solution of copper sulphate, (e. g. ½%) preferably containing a small amount of acetic acid (e. g. 5%). It is then allowed to dry and is finally washed with water to remove excess of the reagents.

The film may then be dried or, without drying, passed to a second printing operation. For example, the first image may correspond to a single color only of the ultimate reproduction such as red, or red-orange, while a second printing operation is relied upon to provide the complemental green or blue-green aspect.

This dye solution may be prepared as follows:

| | |
|---|---|
| (4.5% solution) pontacyl green S N Color Index No. 737; Schulze No. 566 | 6000 cc. |
| Metanil yellow,—Adjustable but approximately | 22 grs. |
| Glacial acetic acid | 600 cc. |
| Water to make | 18000 cc. |

In the second printing operation, it is found that the first color image is not affected nor transfused by the second dye which accordingly is applied independently and without modification by the first. As a result, the color values of both dyes are properly applied to and retained by the blank film without diffusion from areas of greater density to areas of less density, from one color into the other color, or from the margins of the images into the outer areas of the film.

A cinematographic film carrying color or dye images as thus produced may be employed for projection purposes, and will cast colored images characterized by a wide range of contrasts, accurate definition, true color values and color densities, and hence give a precise visual reproduction of the image or images of the matrix film or films employed.

It will be readily appreciated by those skilled in the arts to which the invention is related, that various adaptations of the subject matter may be resorted to in its practical application, but it is to be understood that such adaptations are comprehended by the above disclosure and included by the following claims.

I claim:

1. A method for restraining the diffusion of colored imbibition images in gelatine surfaces and the like, which comprises treating the same with a solution containing a soluble fixing salt, drying the surface, washing, applying a second colored image thereto, complementary to the first, and treating the freshly colored surface with a solution containing a soluble fixing salt, and finally washing.

2. A method for restraining the diffusion of colored imbibition images in gelatine surfaces and the like, which comprises treating the same with a solution containing a soluble fixing salt, drying the surface, washing, and repeating said operations, employing different dye solutions in the successive operations.

3. A method of restraining the diffusion of colored images in gelatine surfaces and the like, which comprises printing a gelatine surface with an acid dye, by imbibition, treating the same with a solution of a copper salt, washing, applying a second colored image upon the printed surface, complementary to the first and treating the freshly colored surface with a solution of a copper salt, and finally washing.

4. An imbibition image, adapted to be enlarged by projection, characterized by being formed in the surface of a gelatine film by an appropriate distribution of a plurality of dye images, severally restrained from diffusion into one another and through said surface, by reaction with a copper salt.

5. A method for restraining the diffusion of colored images, which comprises printing a gelatine film with a dye image, by imbibition, treating the printed image with a fixing reagent and printing the film with a second dye image.

6. A method for restraining the diffusion of colored images, which comprises printing a gelatine film with a dye image, by imbibition, treating the printed image with a fixing reagent and printing the film with a second dye image followed by a fixing reagent.

7. An imbibition image, adapted to be enlarged by projection, characterized by being formed in the surface of a gelatine film by an appropriate distribution of a plurality of dye images, severally restrained from diffusion into one another and through said surface by reaction with a fixing salt.

8. An imbibition image, adapted to be enlarged by projection, characterized by being formed in the surface of a gelatine film by an appropriate distribution of a plurality of dye images, severally restrained from diffusion into one another and through said surface by reaction with a fixing salt of a bivalent metal.

9. An imbibition image, adapted to be enlarged by projection, characterized by being formed in the surface of a gelatine film by an appropriate distribution of a plurality of dye images, severally restrained from diffusion into one another and through said surface by reaction with copper sulphate.

10. An imbibition image adapted to be enlarged by projection, characterized by being formed in the surface of a gelatine film by an appropriate distribution of a plurality of dye images, severally restrained from diffusion into one another and through said surface by reaction with a fixing reagent, said film being otherwise substantially free from said fixing reagent.

LEONARD T. TROLAND.